(12) United States Patent
Parker et al.

(10) Patent No.: US 9,983,854 B2
(45) Date of Patent: May 29, 2018

(54) MANAGING AND SYNCHRONIZING VIEWS IN MULTI-USER APPLICATION WITH A CANVAS

(71) Applicant: LogMeIn, Inc., Boston, MA (US)

(72) Inventors: Michael Parker, Los Gatos, CA (US); E. Patrick Hanavan, III, Winter Springs, FL (US); Jerry Anders, Ojai, CA (US)

(73) Assignee: LogMeIn, Inc., Boston, MA (US)

( * ) Notice: Subject to any disclaimer, the term of this patent is extended or adjusted under 35 U.S.C. 154(b) by 295 days.

(21) Appl. No.: 14/692,281

(22) Filed: Apr. 21, 2015

(65) Prior Publication Data

US 2016/0085381 A1     Mar. 24, 2016

Related U.S. Application Data

(60) Provisional application No. 61/982,247, filed on Apr. 21, 2014.

(51) Int. Cl.
| | |
|---|---|
| *G06F 8/34* | (2018.01) |
| *G06F 9/44* | (2018.01) |
| *G06F 3/14* | (2006.01) |
| *H04L 29/08* | (2006.01) |

(52) U.S. Cl.
CPC ............. *G06F 8/34* (2013.01); *G06F 3/1454* (2013.01); *H04L 67/1095* (2013.01)

(58) Field of Classification Search
CPC .................................. G06F 3/1454; G06F 8/34
See application file for complete search history.

(56) References Cited

U.S. PATENT DOCUMENTS

| | | | |
|---|---|---|---|
| 5,682,439 A | 10/1997 | Beemink et al. | |
| 5,799,320 A | 8/1998 | Klug | |
| 7,187,380 B2 | 3/2007 | VanGilder | |
| 7,293,231 B1 | 11/2007 | Gunn et al. | |
| 8,767,020 B1 | 7/2014 | Monikandan | |

(Continued)

OTHER PUBLICATIONS

Nysetvold et al., Collaboration tools for multi-user CAD, Jun. 27-29, 2013, 2013 IEEE 17th International Conference on Computer Supported Cooperative Work in Design (CSCWD), pp. 241-245.*

(Continued)

*Primary Examiner* — William Bashore
*Assistant Examiner* — Daniel Parcher
(74) *Attorney, Agent, or Firm* — David H. Judson

(57) ABSTRACT

Several methods are described herein to allow users to manage and synchronize views in a multi-user application with canvas (infinite or otherwise) and limited or unlimited zoom. Without these synchronization methods, coordinating views is very difficult, and may lead to chaos as one or more of the users gets lost on the canvas. A "View Sync" method provides for many-to-one synchronization, where many users are automatically synchronized with one user. A "Sync View" method provides for one-to-one synchronization, where one user is synchronized to another user's view. Preferably, off-screen "activity indicators" also are used within the viewport to provide visual cues regarding where other users are drawing or creating content on the canvas. Tapping on an activity indicator preferably performs one-time Sync View with the selected other user.

8 Claims, 12 Drawing Sheets

(56) References Cited

U.S. PATENT DOCUMENTS

| | | | |
|---|---|---|---|
| 2004/0004629 A1 | 1/2004 | Hamilton et al. | |
| 2005/0210402 A1 | 9/2005 | Gunn et al. | |
| 2007/0097150 A1* | 5/2007 | Ivashin | G06F 3/0485 345/660 |
| 2007/0240070 A1 | 10/2007 | Eldridge et al. | |
| 2009/0210814 A1 | 8/2009 | Agrusa et al. | |
| 2010/0036929 A1* | 2/2010 | Scherpa | G06Q 10/10 709/207 |
| 2010/0306706 A1 | 12/2010 | Gill et al. | |
| 2011/0246875 A1 | 10/2011 | Parker et al. | |
| 2012/0317497 A1* | 12/2012 | Red | G06F 17/50 715/751 |
| 2013/0047093 A1* | 2/2013 | Reuschel | G06F 3/04883 715/753 |
| 2013/0111380 A1 | 5/2013 | Parker et al. | |
| 2014/0372939 A1 | 12/2014 | Parker et al. | |

OTHER PUBLICATIONS

Agustina et al., Televiewpointer: an integrated workspace awareness widget for real-time collaborative 3d design systesm, Nov. 7-10, 2010, Group '10 Proceedings of the 16th ACM international conference on Supporting group work, pp. 21-30.*

* cited by examiner

MANAGING AND SYNCHRONIZING VIEWS IN MULTI-USER APPLICATION WITH A CANVAS

BACKGROUND

Technical Field

This disclosure relates generally to technologies, products and services that enable users to collaborate with one another over a network.

Background of the Related Art

Digital whiteboard technologies are known in the art. They provide for near real-time collaborative diagramming and whiteboarding by often geographically-distributed clients, such as users of mobile devices. The technologies enable users to edit the same whiteboard, simultaneously, and to see each of the others' changes. In one implementation, the application is divided into client and server programs. The client program presents a graphical user interface (GUI) or "viewport" to the user, allowing the user to draw pictures, draw lines, place icons, and so on. Also, the client program transmits to the server program any local changes made to the whiteboard. The server program maintains a master whiteboard or "canvas" for a collaboration session. In particular, the server updates the master whiteboard based upon changes it receives from the client programs, and then re-broadcasts those changes to all subscribing clients. One such system of this type is the Zamurai™ Mobile Whiteboard system, which enables users of mobile devices (such as the Apple iPad®) to work on an "infinite" canvas, i.e., a canvas that is effectively unconstrained in size (at least from the user's perspective). Using conventional gestures, a user can zoom in to a specific item on the infinite canvas, zoom out to see a larger picture, add more information, or take other actions that are then available for viewing and interaction by other participants.

While the use of an infinite canvas in this manner provides for significant advantages, after a few random moves or changes to zoom factor, each user typically sees a different region of the canvas within their respective viewport. This can be highly problematic for applications that require users to synchronize their views, or to remain in synchronization for a given time period. Without synchronization, it may be difficult for the users to coordinate their actions, potentially leading to chaos as users seek to locate where their viewport lies within the larger canvas, or to determine what others may be doing elsewhere.

BRIEF SUMMARY

This disclosure provides for a set of synchronization methods implemented in a digital whiteboard to enable user views to be coordinated irrespective of the size of the underlying canvas. The approach enables multiple users to collaborate effectively and simultaneously in real-time as participants in a shared meeting on an infinite canvas.

In one method, a specified user, such as the Moderator of the meeting, activates a "View Sync" (or "follow me") option within his or her user interface. Once the setting is enabled and reported to the server, preferably all participant viewports synchronize and display the same content. Then, as the Moderator moves or zooms the canvas within his or her viewport, the participant views automatically synchronize to track and maintain the same view as the Moderator. This method provides for a one-to-many view synchronization option.

In another method, a first participant in the meeting synchronizes his or her viewport to that of a second participant, e.g., by activating a "Sync View" (or "follow you") option within the first participant's viewport. Once set, the viewports automatically synchronize and display the same content. Thus, as the selected user pans (moves) and zooms the canvas, both views will remain in sync. This is a one-to-one view synchronization option.

According to another method, one or more activity indicators are displayed to inform a viewer that there is activity taking place elsewhere on the canvas (by another user). An indicator is selectable by the user, preferably to facilitate a "Sync View" option. Thus, in a typical use case, and as other users in the session create or modify content away from the user's viewport, one or more activity indicators are displayed, preferably for a configurable time period. When displayed, the activity indicator is selectable. When the user selects a particular activity indicator, the user's viewport changes to match the viewport of the user who is taking the action associated with the selected activity indicator. In particular, preferably tapping on an activity indicator performs one-time Sync View with the selected other user.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
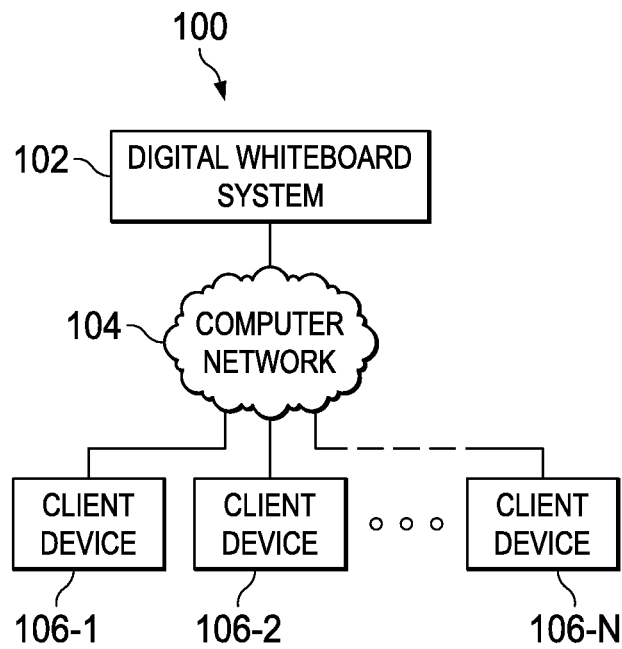
FIG. 1 depicts an extensible digital whiteboard architecture platform that may be used to facilitate the techniques of this disclosure.

FIG. 1 is a block diagram illustrating an example environment 100 in which various embodiments can be implemented. As shown in FIG. 1, the example environment 100 can comprise a digital whiteboard system 102, client devices 106-1 through 106-N (hereafter collectively referred to as "client devices 106"), and a computer network 104 communicatively coupling together the digital whiteboard system 102 and each of the client devices 106. It will be understood that for some embodiments, the components or the arrangement of components may differ from what is depicted in FIG. 1. In accordance with some embodiments, the computer network 104 may be implemented or facilitated using one or more local or wide-area communications networks, such as the Internet, WiFi networks, WiMax networks, private networks, public networks, and the like. Depending on the embodiment, some or all of the communication connections with the computer network 104 may utilize encryption (e.g., TLS, SSL) to secure information being transferred between the various entities shown in the example environment 100.

The digital whiteboard system 102 and each of the client devices 106 may be implemented using one or more digital devices. For instance, the client device 106-1 may be any form of computing device capable of executing an application, presenting a graphical user interface (GUI) canvas through a display (e.g., a touch screen display) coupled to the computing device, presenting on the GUI canvas one or more graphical objects that can be placed, moved, oriented, resized, or connected, presenting a view window over the GUI canvas to assist a user with selecting, placing, moving, orienting, resizing, or connecting a graphical object on the GUI canvas. The GUI canvas and changes made to the GUI canvas may be communicated over the computer network 104 to the digital whiteboard system 102, which can facilitate shared access of the GUI canvas (e.g., as a digital whiteboard) by one or more of the other client devices 106.

For instance, through the computer network 104, the client device 106-1 can provide and receive updates to a GUI canvas presented on a touch screen display coupled to the client device 106-1. Through systems or methods described herein, a user may select, move, orient, resize, or connect graphical objects on a GUI canvas, and such actions at the client device 106-1 can cause updates to be sent to the digital whiteboard system 102. Other client devices 106 that have shared access to the GUI canvas may receive updates via the digital whiteboard system 102 or directly from the client device 106-1. For some embodiments, the GUI canvas constitutes a digital whiteboard on which one or more user may add, remove, and modify (e.g., select, move, orient, connect, resize, etc.) graphical objects, including texts, shapes, images, and the like. The GUI canvas presented through the client devices 106 may be configured to provide users with (or provide the user with the experience of) an infinitely-sized workspace.

The digital whiteboard system in FIG. 1 provides for a near real-time collaborative diagramming and whiteboarding application. The application allows geographically-distributed clients 106 to edit the same whiteboard, simultaneously, and to see each of the others' changes. As the skilled person will appreciate, the application is divided into client and server programs. In FIG. 1, the digital whiteboard system 102 is the server program. In general, the client program presents a graphical user interface (GUI) to the user, allowing him to draw pictures, draw lines, place icons, and so on. Also, the client program transmits to the server program any local changes made to the whiteboard. The server program maintains a master whiteboard for each collaboration session. There may be multiple collaboration sessions occurring on the platform and thus multiple instances of the server program. With respect to a particular session, the server program updates the master whiteboard based upon changes it receives from the client programs, and then re-broadcasts those changes to all subscribing clients. Preferably, clients do not communicate with each other directly in the application. Rather, all communication occurs through the server. As noted, preferably clients transmit changes to the server, the server then updates the master whiteboard, and then the server broadcasts the changes to all other clients who are participating in a collaboration session. During any collaboration, the server is the authoritative source for the current state of the whiteboard. In particular, the server maintains a master whiteboard (the infinite canvas), and all clients reflect that master whiteboard. Before re-broadcasting the changes, the server may alter any whiteboard changes sent to it. The server may also forbid changes, or perform any alteration to changes it deems necessary. Preferably, each client maintains its own local whiteboard, which reflects the master whiteboard on the server. When a user makes a change to the graphical whiteboard displayed to him, and thereby changing the local whiteboard, those changes are sent to the server; as noted, the server then updates its master whiteboard and propagates the changes to all subscribed clients.

Figure 2:
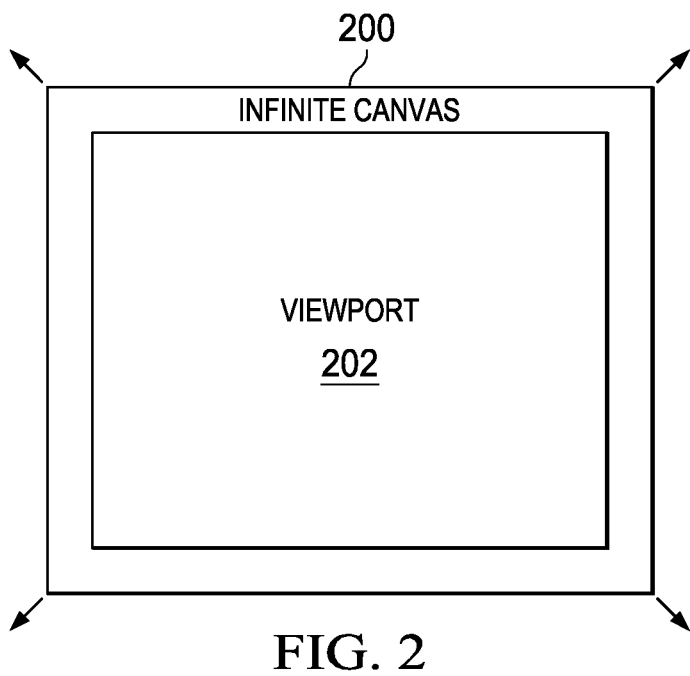
FIG. 2 depicts a relationship between an infinite canvas and a user viewport in the digital whiteboard.

FIG. 2 illustrates the relationship between the infinite canvas 200 associated with the server program, and the individual mobile device GUI viewport 202 that is visible to the user on the physical device. As used herein, the "canvas" (or world) 200 is the element that contains all the collaborative session content including, without limitation, drawings, objects, images or other similar content. The view of the canvas that presents visible content to a user is defined as the viewport 202. As an analogy, the viewport can be thought of as a stationary window just above the canvas where the infinite canvas can be moved in any direction below the viewport. As a user pans, new content is brought into view and content that was previously visible is pushed out of view. The user also can zoom in or out, which also changes the view within the viewport 202 such that more or less content can be seen. From the user's perspective, the canvas is unconstrained in size and thus "infinite." An absolute size for the canvas (from the system perspective) may be implemented based on resource or other processing and storage constraints.

Mobile devices, such as a smartphone, tablet or wearable (e.g., Apple iPhone® and iPad® tablet, Google® Glass™, and others) may be used as the client device 106. Depending on the number of uses and the size of the canvas, the server program may be implemented on a machine (or machines) with more processing and storage capabilities. This is not a requirement, as the server program itself may be implemented on a mobile device. Typically, a mobile device includes a digital whiteboard client application, such as Zamurai™ Mobile Whiteboard, which is augmented to provide the functionality described herein. The client application may be downloaded and installed via a mobile application delivery service, such as the Apple® App™ Store, Google Play, Android™ Market (or equivalents), or it may be provided as a native application to a connected device. In one embodiment, the client application is augmented according to this disclosure to provide the synchronization support of this disclosure, and this functionality may be implemented in any convenient manner, e.g., using an applet, an ActiveX control, native code, plug-ins, or the like.

Generalizing, one or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Figure 3:
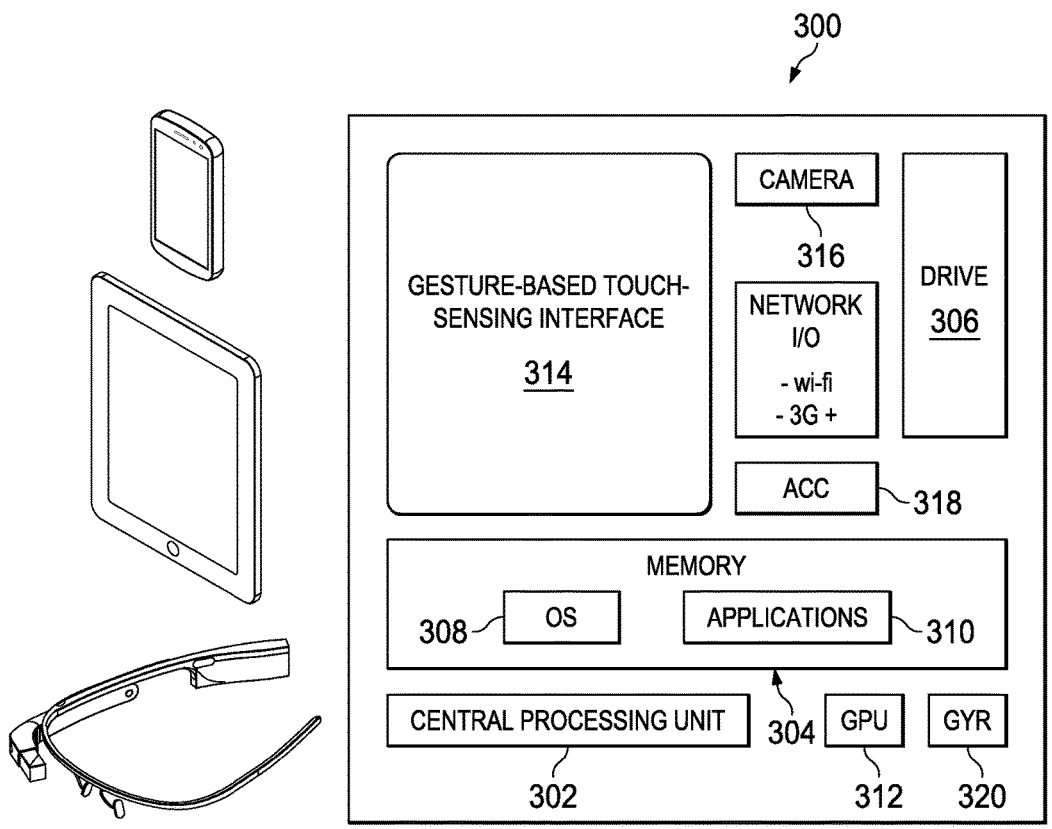
FIG. 3 is an exemplary block diagram of a mobile device that is used in the system.

In this example, the mobile device is an Apple iPad® or iPad2, iPad Mini, an Android™-based smartphone or tablet, a Windows®-based smartphone or tablet, Google Glass wearable, or the like. As seen in FIG. 3, a representative mobile device 300 comprises a CPU (central processing unit) 302, such as any Intel- or AMD-based chip, computer memory 304, such as RAM, and a drive 306. The device software includes an operating system (e.g., Apple iOS, Google® Android™, or the like) 308, and generic support applications and utilities 310. The device may also include a graphics processing unit (GPU) 312. In particular, the mobile device typically also includes a touch-sensing device or interface 314 configured to receive input from a user's touch and to send this information to processor 312. The touch-sensing device typically is a touch screen. The touch-sensing device or interface 314 recognizes touches, as well as the position, motion and magnitude of touches on a touch sensitive surface (gestures). In operation, the touch-sensing device detects and reports the touches to the processor 312, which then interpret the touches in accordance with its programming. The device also comprises a high-resolution camera 316 for capturing images, an accelerometer 318, a gyroscope 320, and the like.

As noted, the device also includes the digital whiteboard application as one of the applications 310.

Generalizing, the mobile device is any wireless device. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The client is not limited to a mobile device, as it may be a conventional desktop, laptop or other Internet-accessible machine or Internet-of-Things (IoT) connected device.

The server may be implemented as multiple components, e.g., as a server farm. Thus the term server herein should be broadly construed to refer to systems, machines, devices, processes and programs that provide the server-implemented functions recited. As noted above, there may be multiple server instances executing in different networks or locations. When the server handling the particular collaboration receives client requests, it processes the requests and sends updates to each of the client that are part of a session, and each client maintains a local copy of the shared whiteboard during the session. An infrastructure that provides the above-described collaboration architecture may include other back-end services, such as name services, load balancing, storage, account management, and the like.

Managing and Synchronizing Views in a Multi-User Application with Infinite Canvas As noted above, this disclosure provides for a set of synchronization methods implemented in a digital whiteboard such as described above to enable user views to be coordinated irrespective of the size of the underlying virtual canvas. The approach enables multiple users of client devices to collaborate effectively and simultaneously in real-time as participants in a shared meeting on the infinite canvas.

As will be described below, preferably three (3) distinct synchronization methods are described.

The first method, which is referred to herein as "view synchronization" (or "View-Sync"), enables a particular view (typically that of a Moderator or leader) to be seen by preferably all other participants in the session. In this approach the selected viewport is provided at the other participant viewports. This is a one-to-many synchronization.

The second method, which is referred to herein as "synchronization view" (or "Sync-View" or "follow you"), enables a particular view on a first user's viewport to be seen at the viewport of another user. This is a one-to-one synchronization.

The third method operates in association with one or both of the above-described methods. In this method, an "on-screen" activity indicator is displayed to a user to indicate that some other participant is taking an action elsewhere on the canvas (namely, "off-screen" or out-of-view of the current user's viewport). The indicator is selectable by the user, preferably for a configurable time period (e.g., a few seconds after being displayed). Upon selection, the user's viewport may then be automatically associated in a Sync-View to the viewport of the user taking the action that is represented by the off-screen activity indicator.

Thus, in the first method, a specified user, such as the Moderator of the meeting, activates the "View Sync" option within his or her user interface. Once the setting is enabled and reported to the server, preferably all participant viewports synchronize and display the same content. There may be circumstances when less than all of the other users are synchronized (e.g., to the Moderator) in response to the View Sync command, although typically the "follow me" mode impacts all others. Then, as the Moderator moves or zooms the canvas within his or her viewport, the participant views automatically synchronize to track and maintain the same view as the Moderator. In contrast, and in the second method, a first participant in the meeting synchronizes his or her viewport to that of a second participant, e.g., by activating the "Sync View" option within the first participant's viewport. Once set, the viewports automatically synchronize and display the same content. Thus, as the selected user pans (moves) and zooms the canvas, both views may remain in sync. The synchronization preferably ends when the first participant pans, zooms or creates content. In the third method, the one or more "off-screen" activity indicators are displayed to inform a viewer that there is activity taking place elsewhere on the canvas (by one or more other users). When displayed, the activity indicator preferably is selectable. When the user selects a particular activity indicator, the user's viewport preferably changes to match the viewport of the user who is taking the action associated with the selected activity indicator.

Figure 4:
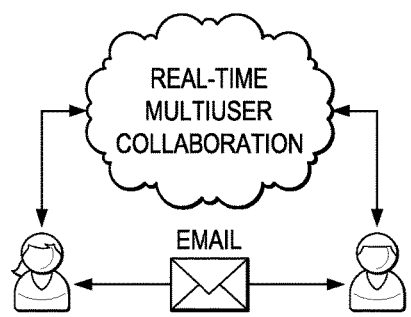
FIG. 4 depicts contents of an infinite canvas in an example scenario.

These methods as now further described by way of example. For illustrative purposes, FIG. 4 depicts contents of an infinite canvas 300, and there are three (3) users, a Moderator, and second and third users ("user2" and "user3").

Figure 5:
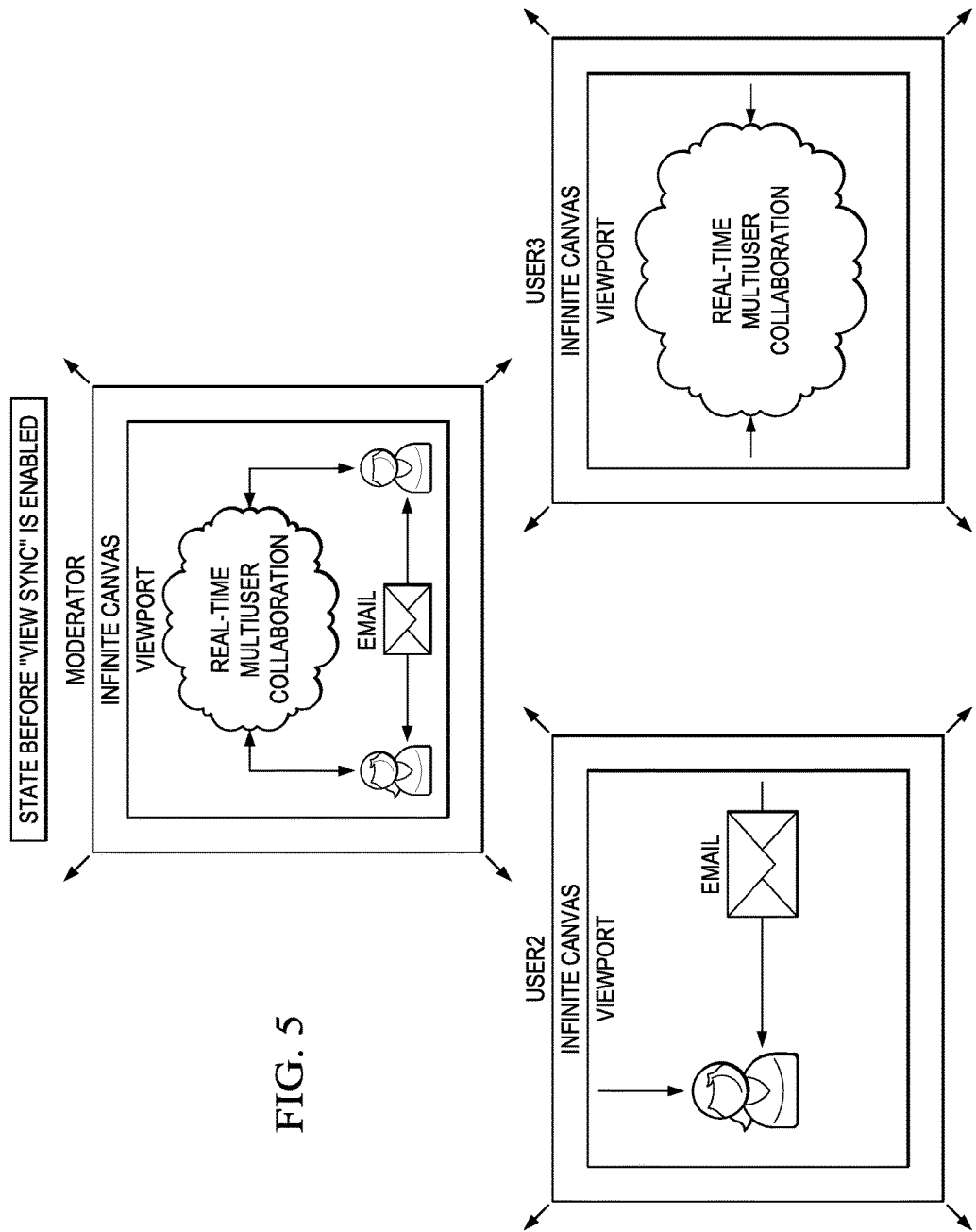
FIG. 5 depicts the state of each user's viewport relative to the infinite canvas of FIG. 4 before a "View Sync" feature is enabled by a Moderator.
Figure 6:
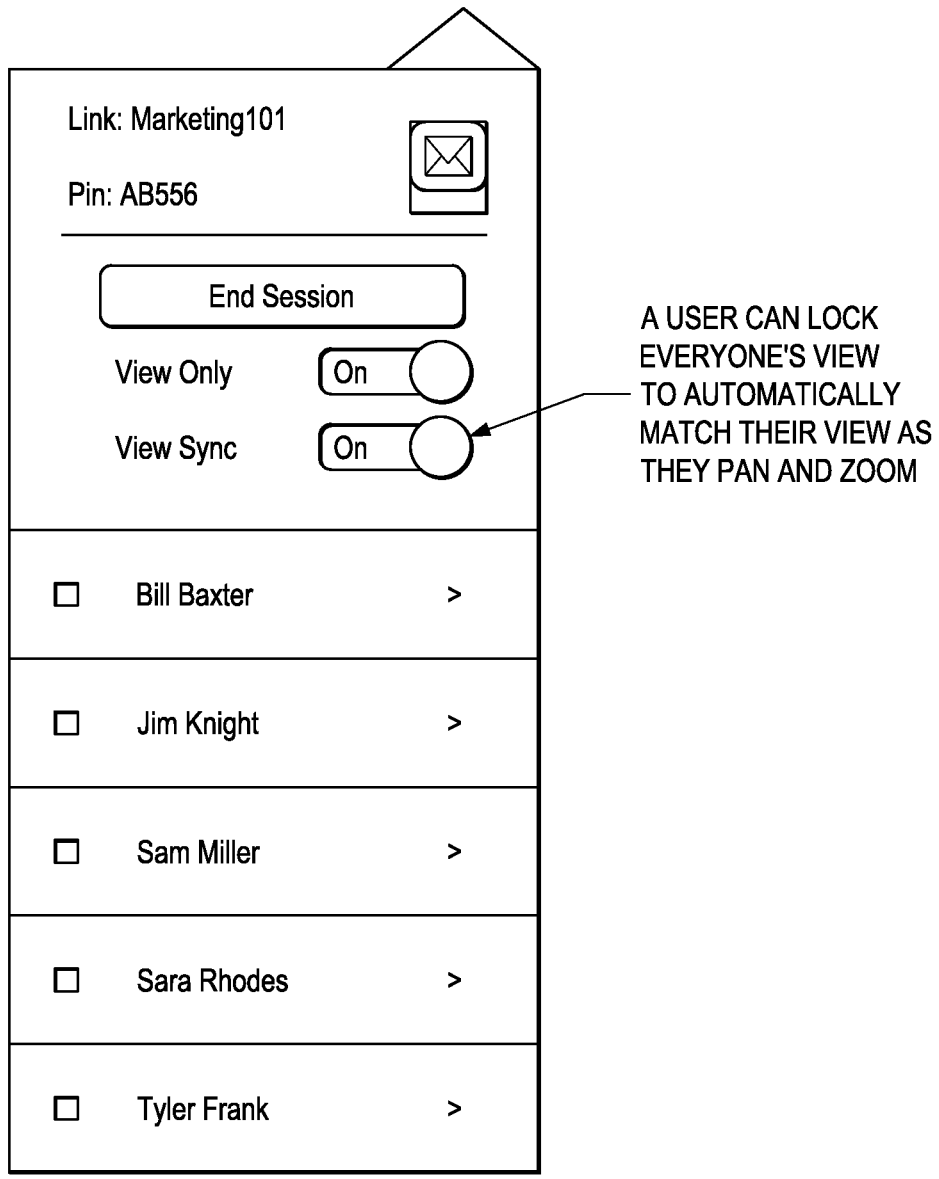
FIG. 6 illustrates a GUI control by which a Moderator selects the "View Sync" control.
Figure 7:
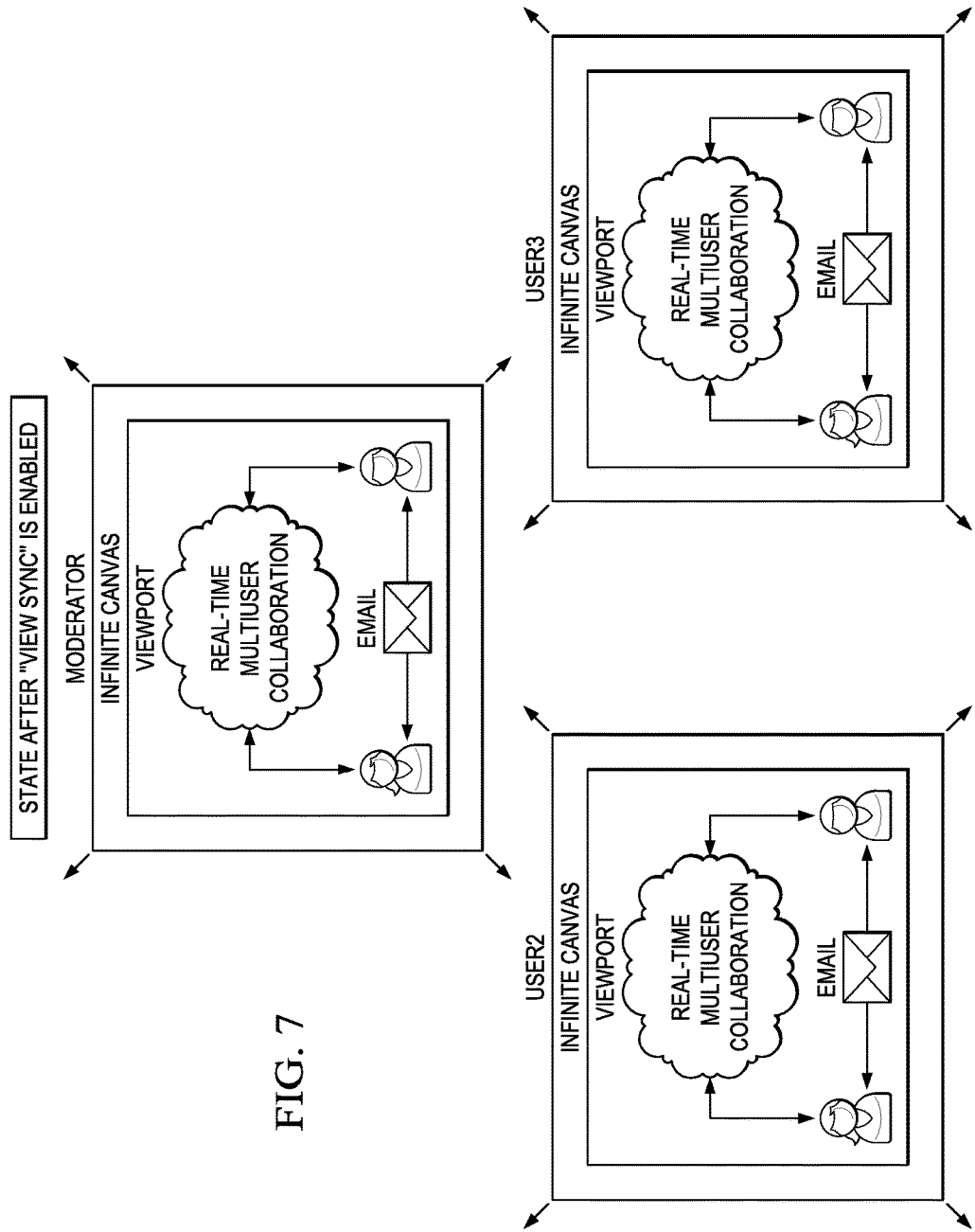
FIG. 7 depicts the state of each user's viewport relative to the infinite canvas of FIG. 4 after the "View Sync" feature is enabled.
Figure 8:
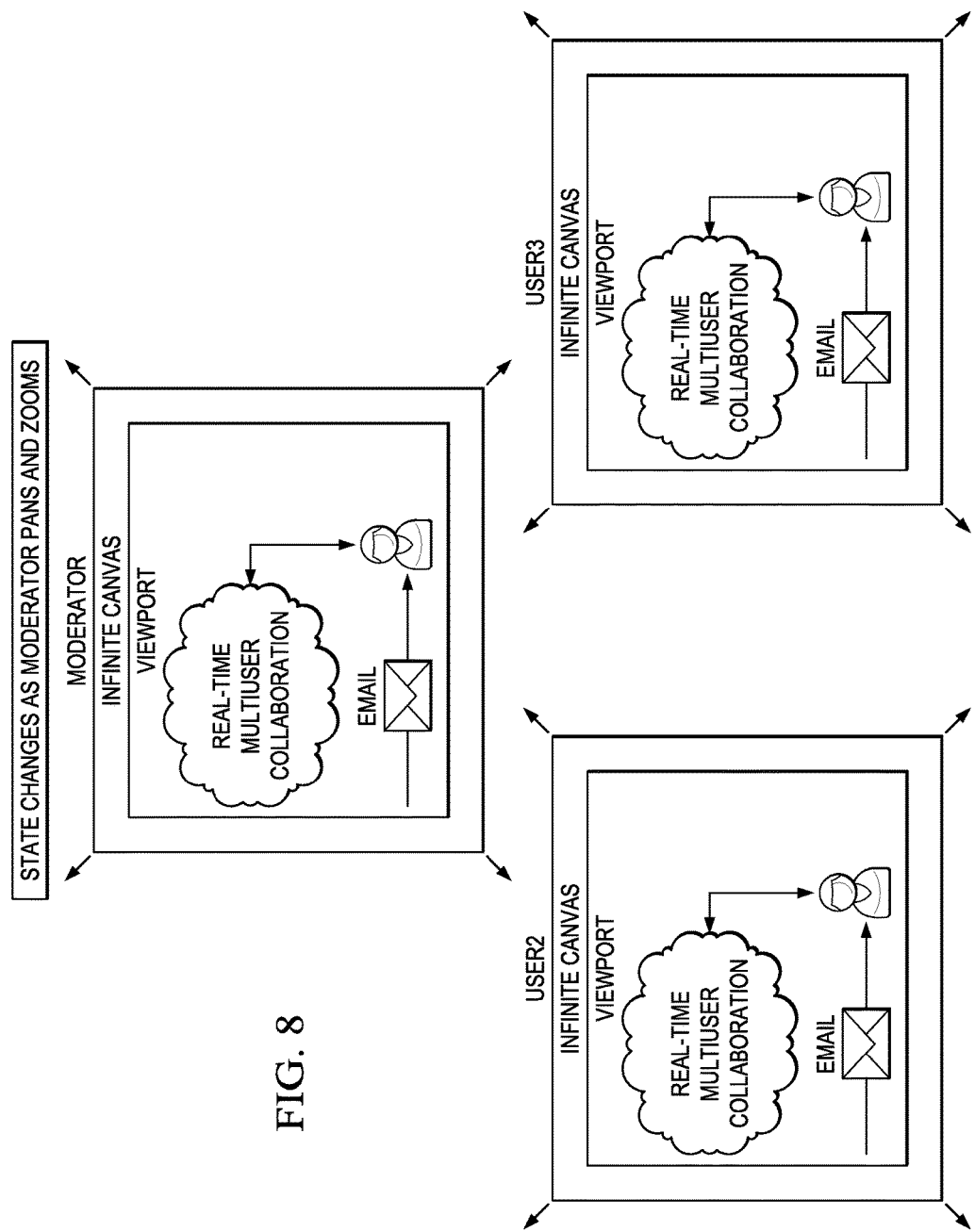
FIG. 8 depicts the synchronized views as the Moderator pans and zooms.

FIG. 5 depicts the state of each user's viewport relative to the infinite canvas before the "View Sync" feature is enabled by the Moderator. Using a GUI control such as shown in FIG. 6, the Moderator selects the "View Sync" button (or similar control) to lock each user's view and thus automatically match their view to that of the Moderator. FIG. 7 depicts the state of each user's viewport relative to the infinite canvas after the "View Sync" feature is enabled. As can be seen, each user's view is now synchronized to the Moderator's view. FIG. 8 depicts the synchronized views as the Moderator pans and zooms; as can be seen, each user's view still remains synchronized.

Typically, the View Sync feature is enabled by the Moderator to bring all other user viewports into a common view. Although not illustrated, a skilled person will appreciate that the View Sync feature may also be used to bring fewer than all other user viewports into alignment with that of the Moderator. Thus, for example, the Moderator may elect a sub-grouping of user viewports with which the View Sync feature is then enabled.

Figure 9:
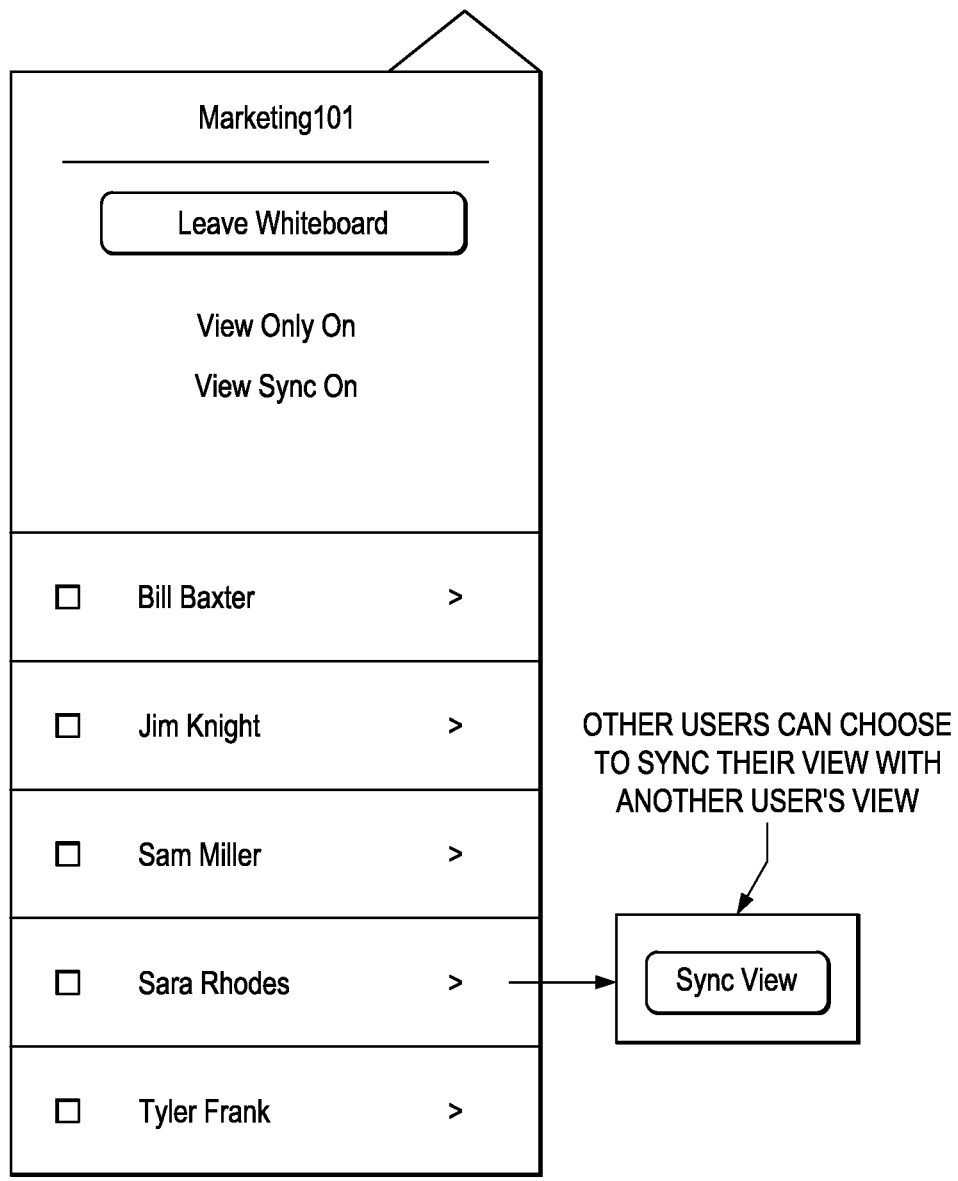
FIG. 9 depicts a particular user's GUI control to implement a "Sync View" mode of operation according to this disclosure.
Figure 10:
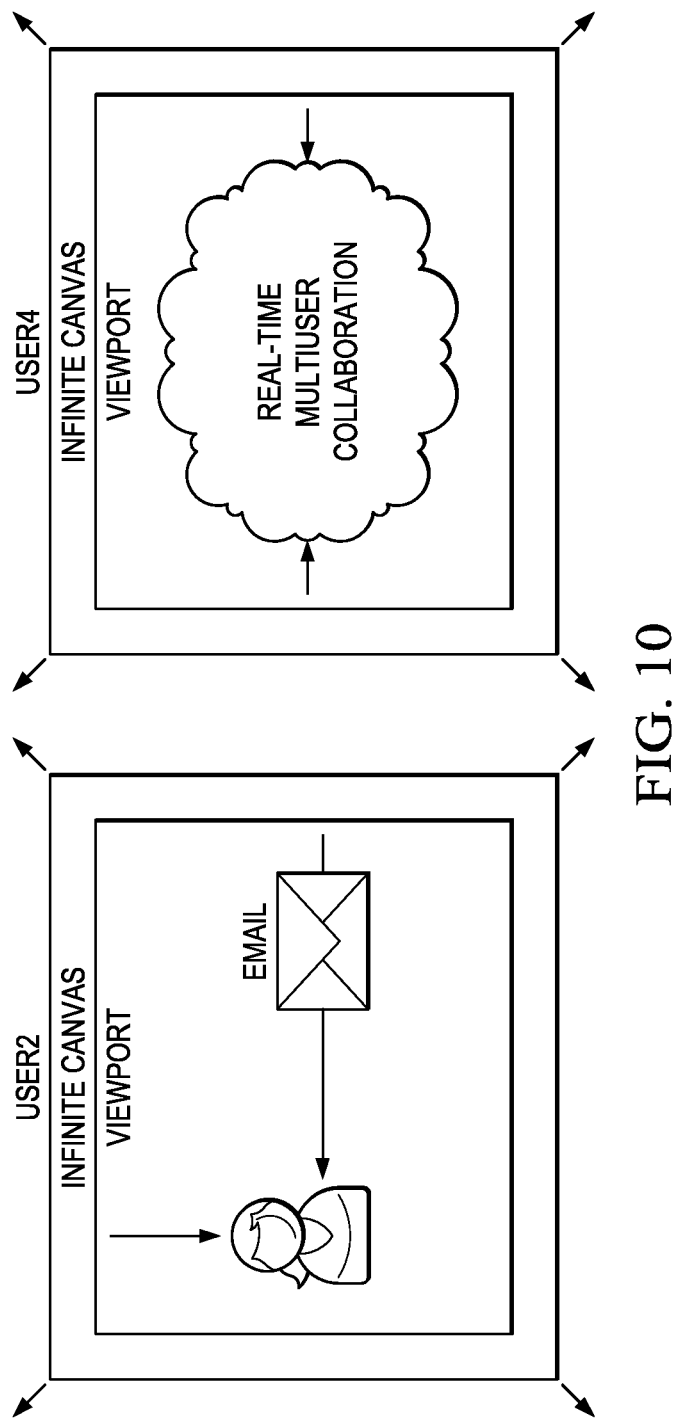
FIG. 10 depicts the state of the viewports for a pair of users before one of the users enables the Sync View mode.
Figure 11:
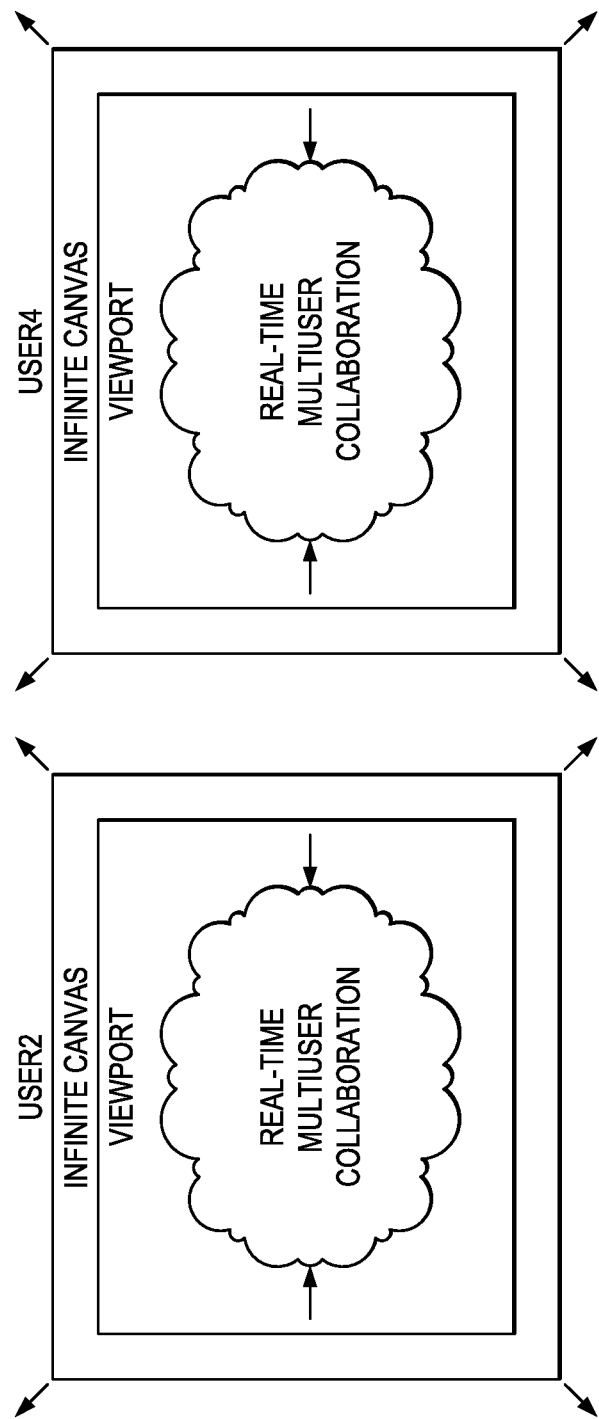
FIG. 11 depicts how the viewports for the users become synchronized after the Sync View button is selected by a user with respect to another user.
Figure 12:
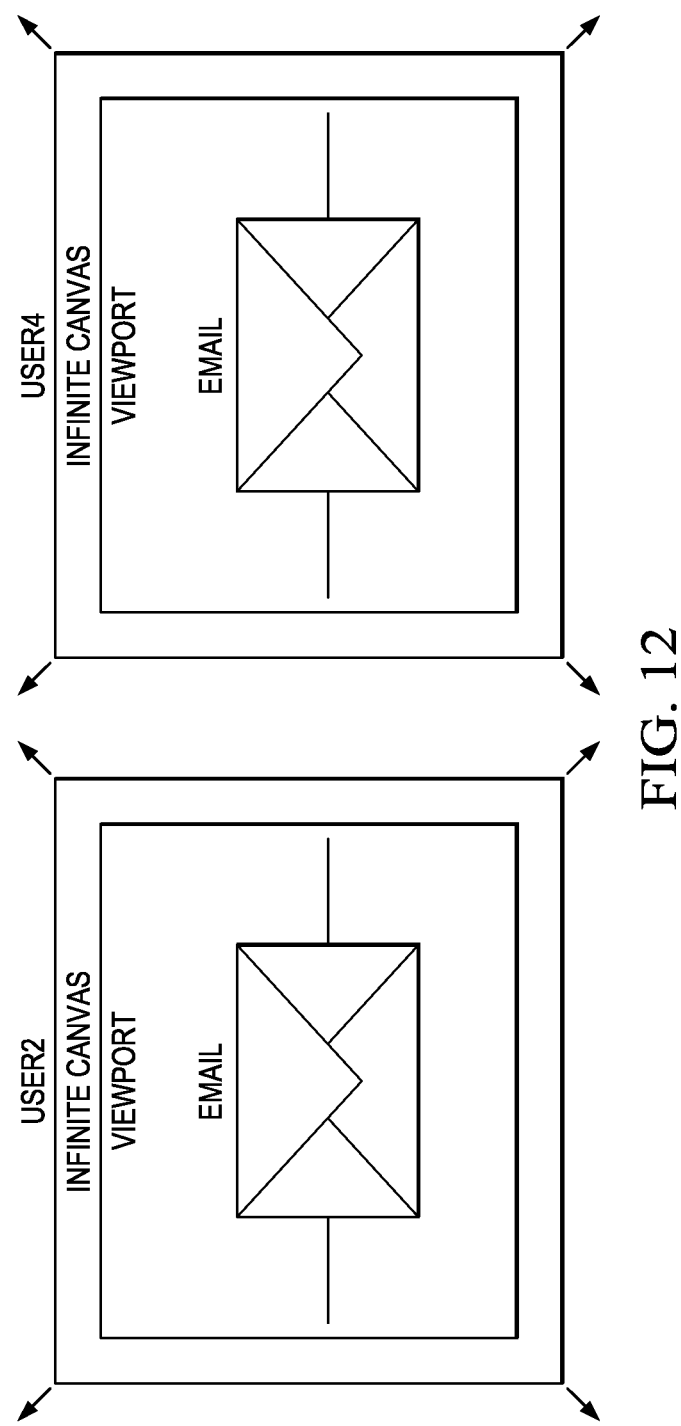
FIG. 12 depicts how the two viewports remain synchronized as a user takes a particular action.

In the second method, which is now described, one user's view is synchronized to another user's view. In this scenario, in a multi-user application with an infinite canvas, user1 can elect to have his or her viewport synchronized with another participant (user2, or user3, or . . . userN). For example, if user2 were to elect to sync with user4, then as user4 pans or zooms both user2 and user4 will see the same content within their respective viewports. As an example, FIG. 9 depicts a particular user's GUI control, which identifies each of the other participants in the session. Typically, each user will have a similar control so that each of the participants can see who is present. Within the UI, a user in the shared meeting then selects another user from the list of participants selects a "Sync View" button. Once set, the user's viewport automatically synchronizes and displays the same content as the select user's viewport. As an example scenario, FIG. 10 depicts the state of the viewports for user2 and user 4 before user2 selects the Sync View button to synchronize his or her viewport with that of user4. After user2 selects the Sync View button in association with a designation for user4, the viewports synchronize, such as shown in FIG. 11. As illustrated in FIG. 12, if user4 then changes his or her view (e.g., by zooming), user2's viewport remains synchronized with user4's viewport. In other words, as the selected user pans (moves) and zooms the canvas, both views remain in sync.

Once linked in this manner, the synchronization may continue until, for example, user2 creates content or otherwise takes an action (zoom or pan) that ends the synchronization.

Although not shown in detail, a particular user may have the ability to link more than one other user in the Sync View mode. Thus, for example, a sub-grouping of users may be first identified and then associated for Sync View operation.

Figure 13:
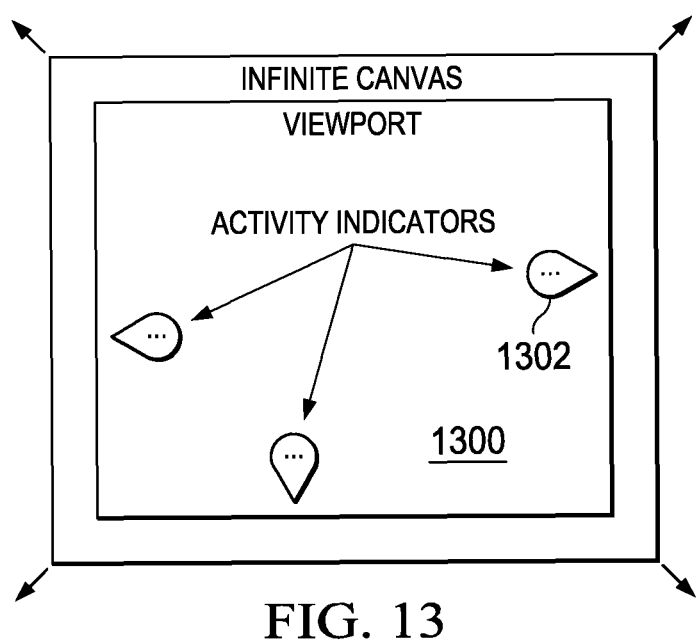
FIG. 13 depicts a user viewport displaying an off-screen "activity indicator" according another embodiment of this disclosure.

The third method provides a way to notify a user of activity elsewhere on the infinite canvas, and to allow synchronization of views in response. Typically, the synchronization is achieved using the "Sync View" mode previously described. For example, with an infinite canvas, other users may create content in areas outside a single user's viewport. FIG. 13 depicts a user viewport 1300. When another user is drawing on the canvas (off-screen with respect to the canvas 1300), an off-screen "activity indicator" 1302 is displayed in the viewport to provide the user an indication of such activity. Preferably, the off-screen activity indicator is color-coded to provide a cue to the user regarding which other user is taking the action. Each participating user preferably is assigned a different color by the system for this purpose. As shown in FIG. 13, there are three (3) other users adding or modifying content to the canvas, and their relative positions on the canvas are indicated by the placement of the activity indicators. A particular activity indicator thus preferably is color-coordinated to the user taking the action at that location. The activity indicator may be "activated" for a configurable time period, during which it may be selected by the user. Thus, and in this embodiment, the activity indicator functions like a "Sync View" button. Preferably, the button is a "one-time" action in that tapping on the off-screen activity monitor shifts the current user's viewport to match that of the other user, but preferably it does not necessarily auto-enable Sync View going forward.

Thus, when another user creates or modifies content away from the current user's viewport 1300, the activity indicator 1302 is displayed for the time period. When displayed, the activity indicator is selectable. When the activity indicator is then selected, the user's viewport 1300 changes to match the other user's viewport.

Figure 14:
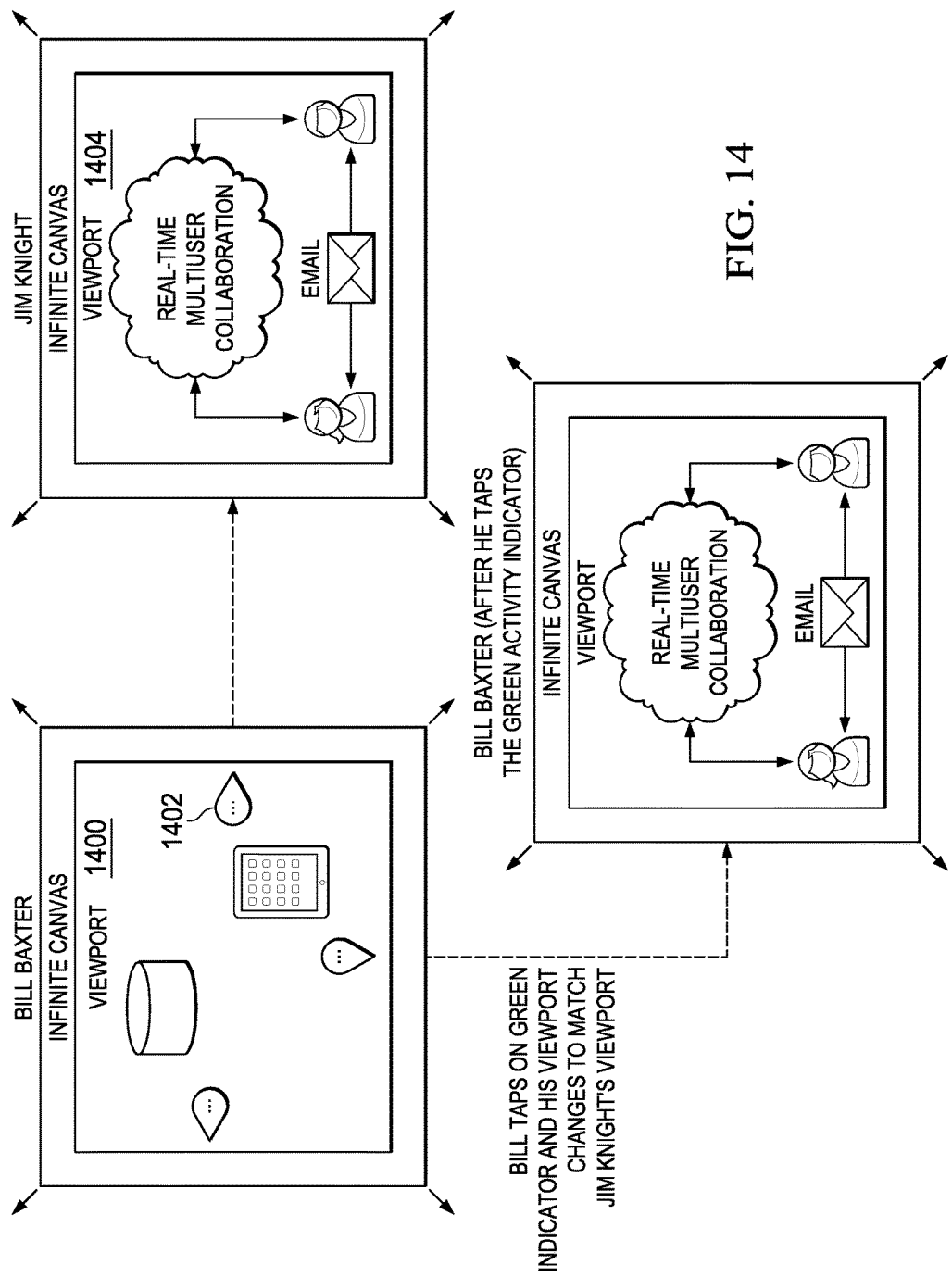
FIG. 14 depicts how an off-screen activity indicator may be selected to facilitate a View Sync operating mode according to this disclosure.

FIG. 14 depicts this operation for the users "Bill Baxter" and "Jim Knight." In the upper left, user Bill Baxter's viewport 1400 is shown, together with three (3) activity indicators. The green indicator 1402 pointing to the right of the viewport 1400 indicates that user Jim Knight is creating content. The content that user Jim Knight is creating is shown in viewport 1404. When user Bill Baxter selects the green activity indicator 1402, his viewport 1400 automatically changes to match the viewport 1404 of user Jim Knight, as indicated in the bottom portion of the drawing.

Typically, the off-screen activity notification and synchronization technique implements the Sync View operation, but this is not a limitation. There may be circumstances when the Moderator is provided an off-screen activity indicator that he or she then selects to initiate the View Sync operation.

To summarize, the methods described herein allow users to manage and synchronize views in a multi-user application with canvas (infinite or otherwise) and limited or unlimited zoom. Without these synchronization methods, coordinating views is very difficult, and may lead to chaos as one or more of the users gets lost on the canvas. The "View Sync" method provides for many-to-one synchronization where many users are automatically synchronized with one user, whereas the "Sync View" method provides for one-to-one synchronization where one user is synchronized to another user's view. Typically, Sync View and View Sync are settings that are turned on and remain on until they are turned off. Preferably, "activity indicators" are also used within the viewport to provide visual cues regarding where other users are drawing or creating content on the canvas. Tapping on an activity indicator preferably performs one-time Sync View with the selected other user.

The following provides additional details regarding an application programming interface (API) over which clients communicate with the server. Preferably, the communication between clients and the server occurs according to the protocol. In this embodiment, which is not intended to be limiting, the API is exposed through a protocol such as XMPP. XMPP protocol is a near real-time communication protocol for transmitting small XML messages between networked computers. The XMPP protocol is a stateful protocol insofar as it uses long-running TCP/IP connections left open between nodes. It consists of small XML stanzas, transmitted intermittently as changes occur, over long-running TCP/IP connections.

The API comprises pre-defined XMPP message types, which correspond to method calls. API methods are called by transmitting XMPP packets to the server, and receiving responses from the server. According to the API, preferably the server software is implemented as an XMPP Component. This means that the server is another XMPP client that runs on the same machine as the XMPP protocol server. This is not a limitation of the architecture. The API also exposes an upload/download service (preferably using HTTP) for transmitting large objects, such as entire whiteboard files, or custom images. That HTTP API responds to simple HTTP GET and PUT requests. In addition, the server preferably sends events to all clients that have joined a particular collaboration session. Preferably, those events are asynchronous XMPP packets of type Message. All clients listen for those events. The server sends asynchronous XMPP messages to all clients indicating changes to the master whiteboard, which changes must then be reflected in the client local whiteboards.

Without limitation, a set of XMPP methods/packet types are supported by the API: Method: start-collaboration, Method: join-collaboration, Method: leave-collaboration, Method: end-collaboration, Method: change-whiteboard, Method: request-to-upload-resource, Method: repeat-changes, Method: request-edit-lock, Method: relinquish-edit-lock, Method: point-laser, and Method: grab-objects. Additional XMPP methods (namely, view-sync, sync-view, etc.) are then supported for the above-described methods.

In addition to the above XMPP methods, the server also sends asynchronous notification messages to all clients. There are several types of notification messages: notifying the clients of some change to the whiteboard (i.e. an object has been set or deleted), notifying the clients that an upload of a custom image has completed, notifying the clients that a laser pointer of a given color is pointing somewhere on the whiteboard, notifying the clients that a collaboration has ended, notifying the clients that the moderator has turned view-sync on or off, and notifying the clients that the roster for a collaboration has changed (distinct from XMPP roster messages). Every time changes are made to the master whiteboard, the change-whiteboard notification is sent to each client indicating the changes. All clients must update their local whiteboards appropriately to reflect the master whiteboard on the server.

Thus, for example, for the XMPP Method: view-sync, a view-sync message indicates that all other clients should have their window settings adjusted to match that of the sender. It indicates that all users should be viewing the same area of the canvas now. This message is re-broadcast to all other clients of a collaboration session. The canvas window settings are then changed by setting a "canvas" object using the set-objects method.

When the Moderator has turned View-Sync on or off, a view-sync notification message is sent from the server to all clients to indicate the setting. As noted above, when view-sync has been turned on, all clients must view the same location on zoom on the whiteboard as the Moderator. This information is conveyed by updating the canvas object on the whiteboard.

The other methods described herein are implemented using similar XMPP methods and notifications messaging.

While XMPP is a preferred messaging protocol, it is not a limitation, as other protocols such as AMQP, MQTT, etc., may be used.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The described commercial products, systems and services are provided for illustrative purposes only and are not intended to limit the scope of this disclosure.

The techniques herein are not limited for use with touch-based systems. While touch-based systems are preferred, the techniques may be implemented using any style computing machine with other input devices, such as a mouse, keyboard, or the like.

The techniques herein provide for improvements to technology or technical field, namely, mobile device-based collaboration environments, as well as improvements to various technologies such as whiteboards, image capture, image transfer, data transformations that support data transfer over a wide area network, and the like, all as described.

Having described our invention, what we now claim is as follows:

1. A method to enable users of mobile devices to collaborate in a session over a canvas, wherein a mobile device client includes a graphical user interface (GUI) viewport, and wherein viewports on individual mobile devices are capable of displaying different portions of the canvas concurrently, the method comprising:
    establishing and maintaining a whiteboard for the session;
    receiving a request for a change to the whiteboard from a mobile device client and, in response, updating the whiteboard to reflect the change and notifying one or more other mobile device clients of the change;
    enabling the whiteboard to receive synchronization requests during the session, wherein a synchronization request is one of: a first type, and a second type, the first type being a synchronization request received from a given mobile device client and indicating that one or more other mobile device clients should synchronize their viewports to the viewport of the given mobile device client, and the second type being a synchronization request received from a first mobile device client and indicating that the first mobile device client desires to synchronize its viewport to that of a second mobile device client;
    providing an activity indicator to the first mobile device of an activity of a user of a second mobile device, the activity indicator being a one-time use synchronization request of the second type and indicating a relative position on the canvas of the activity of the user of the second mobile device with respect to a viewport of the first mobile device client, the activity occurring out-of-view of the first mobile device's viewport, the activity indicator adapted to be acted upon to generate a response to the one-time use synchronization request for a configurable time period;
    receiving a response to the one-time use synchronization request of the second type in response to a selection of the activity indicator by a user of the first mobile device client; and
    enforcing the one-time use synchronization request to one-time synchronize viewports across the session.

2. The method as described in claim 1 wherein the given mobile device client is associated with a moderator of the session, and the first type of synchronization request synchronizes the viewports of the other mobile device clients to the moderator's viewport.

3. The method as described in claim 1 wherein the first mobile device client is associated with a participant of the session, and the second type of synchronization request synchronizes the viewport of the first mobile device client to the viewport of the second mobile device client.

4. The method as described in claim 1 wherein the activity indicator has a visual cue uniquely associated with the user of the second mobile device client.

5. The method as described in claim 1 wherein, relative to a viewport, the canvas is infinite.

6. The method as described in claim 1 wherein the mobile devices are networked together and the requests are communicated via a real-time communication protocol.

7. The method as described in claim 6 wherein the real-time communication protocol is XMPP.

8. A server apparatus, comprising:
    at least one processor;
    computer memory holding computer program instructions operative to enable users of mobile devices to collaborate in a session over a canvas, wherein a mobile device client includes a graphical user interface (GUI) viewport, the computer program instructions operative to:
        establish and maintain a whiteboard for the session;
        receive a request for a change to the whiteboard from a mobile device client and, in response, update the whiteboard to reflect the change and notify one or more other mobile device clients of the change;
        enable the whiteboard to receive synchronization requests during the session, wherein a synchronization request that is one of: a first type, and a second type, the first type being a synchronization request received from a given mobile device client and indicating that one or more other mobile device clients should synchronize their viewports to the viewport of the given mobile device client, and the second type being a synchronization request received from a first mobile device client and indicating that the first mobile device client desires to synchronize its viewport to that of a second mobile device client;
        provide an activity indicator to the first mobile device of an activity of a user of a second mobile device, the activity indicator being a one-time use synchronization request of the second type and indicating a relative position on the canvas of the activity of the user of the second mobile device with respect to a viewport of the first mobile device client, the activity occurring out-of-view of the first mobile device's viewport, the activity indicator adapted to be acted upon to generate a response to the one-time use synchronization request for a configurable time period;
        receive a response to the one-time use synchronization request of the second type in response to a selection of the activity indicator by a user of the first mobile device client; and
        enforce the one-time use synchronization request to one-time synchronize viewports across the session.

* * * * *